US007528363B2

(12) United States Patent
Fukase

(10) Patent No.: US 7,528,363 B2
(45) Date of Patent: May 5, 2009

(54) IMAGE FORMING APPARATUS WITH NOISE REDUCTION

(75) Inventor: Yasuhiro Fukase, Suntoh-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 11/438,556

(22) Filed: May 22, 2006

(65) Prior Publication Data

US 2006/0266937 A1 Nov. 30, 2006

(30) Foreign Application Priority Data

May 27, 2005 (JP) ............................. 2005-155475

(51) Int. Cl.
  *H01J 3/14* (2006.01)
  *H01J 5/16* (2006.01)
  *H01J 40/14* (2006.01)
(52) U.S. Cl. ...................... 250/234; 347/259; 347/261; 359/201; 359/216; 358/474
(58) Field of Classification Search ................. 359/201, 359/216–219; 250/234; 347/259–261; 358/474, 358/481
  See application file for complete search history.

(56) References Cited

U.S. PATENT DOCUMENTS 6,525,751 B2 * 2/2003 Hoover ....................... 347/116

6,684,041 B2 * 1/2004 Yokomori et al. ........... 399/167
2003/0202221 A1 * 10/2003 Motoi et al. ................. 358/474
2005/0134677 A1 * 6/2005 Kawasaki et al. ........... 347/238

FOREIGN PATENT DOCUMENTS

| EP | 123109 A | * | 1/1985 |
| JP | 09-230273 A | | 9/1997 |
| JP | 2003-089467 A | | 3/2003 |
| JP | 2005156919 | * | 6/2005 |

* cited by examiner

*Primary Examiner*—Thanh X Luu
*Assistant Examiner*—Francis M Legasse, Jr.
(74) *Attorney, Agent, or Firm*—Canon U.S.A., Inc. I.P. Division

(57) ABSTRACT

An image forming apparatus is provided which includes a plurality of optical scanners, each including a rotating polygon mirror adapted to scan and expose a surface of an image bearing medium to create an electrostatic latent image on the surface in accordance with image data. The apparatus further includes a plurality of phase detectors, each assigned to a respective one of the plurality of optical scanners for detecting rotated phases of the rotating polygon mirrors. Moreover, the apparatus includes a rotated phase controller configured to control the rotated phases of the rotating polygon mirrors. The rotated phase controller is configured to control the rotated phases of the rotating polygon mirrors in accordance with results of detection by the plurality of rotated phase detectors so that rotated phase relationships of the rotating polygon mirrors are set to a predetermined pattern.

10 Claims, 6 Drawing Sheets

FIG. 4A    FIG. 4B
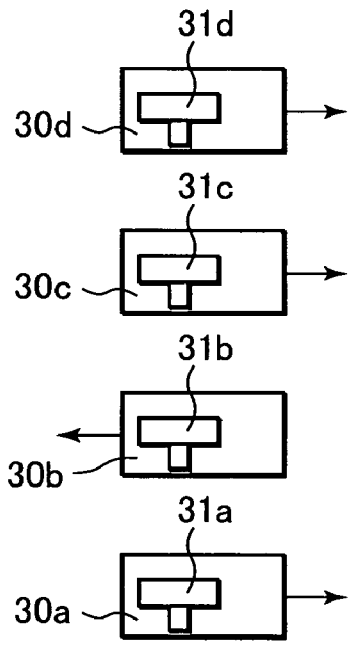
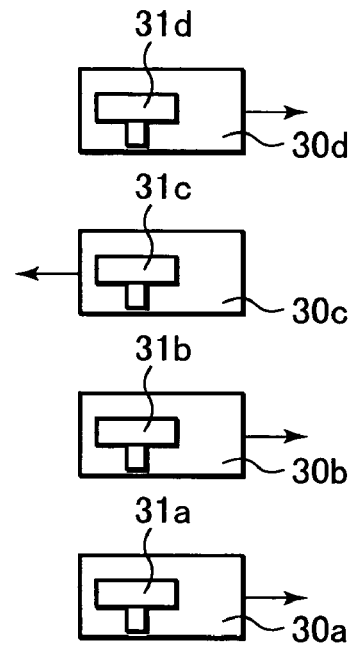
FIG. 5
| PHASE | VIBRATION |
|---|---|
| (a) | 14.76 |
| (b) | 0.36 |
[μm]
FIG. 6
| PHASE | NOISE |
|---|---|
| (a) | 5.51 |
| (b) | 4.84 |
[Bels]

| PHASE PATTERN | NOISE |
|---|---|
| a | 5.51 |
| b | 4.84 |
| c | 5.32 |
| d | 5.17 |
| e | 5.00 |
| f | 4.99 |
| g | 5.29 |
| h | 5.25 |

[Bels]

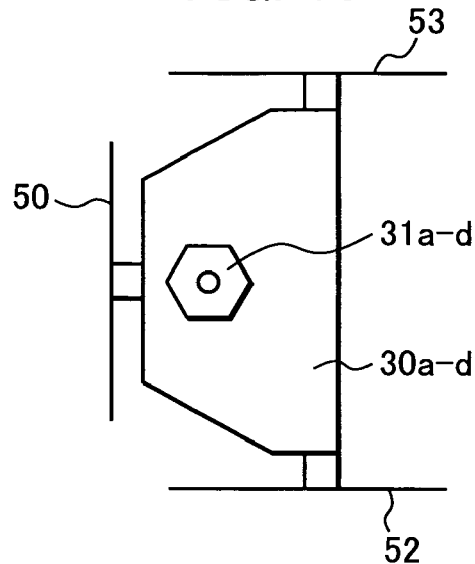
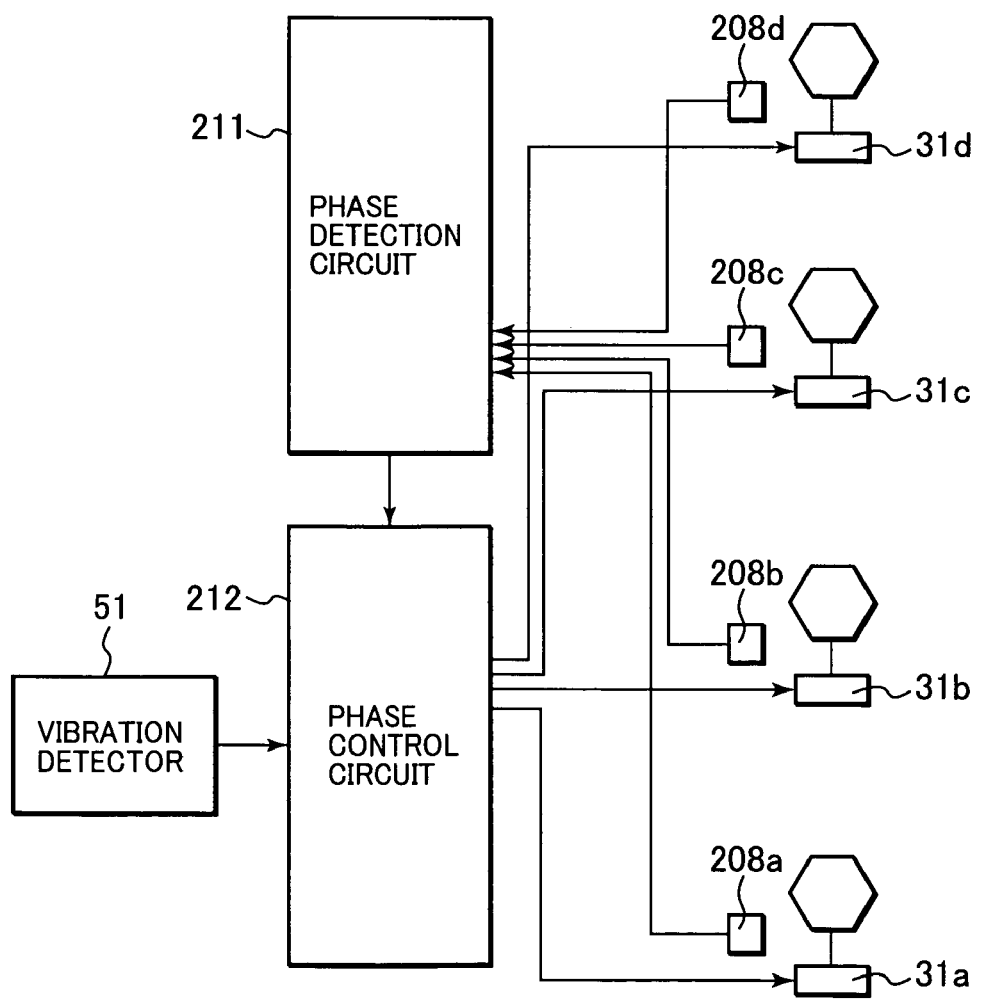

IMAGE FORMING APPARATUS WITH NOISE REDUCTION

BACKGROUND OF THE INVENTION

1. Field of the Invention

The present invention relates to an image forming apparatus such as a copying machine, a printer, a facsimile system or a composite OA (office automation) machine, and in particular, to an image forming apparatus adapted to aim at reducing noise during operation.

2. Description of the Related Art

An image forming apparatus such as a copying machine or a printer includes several movable components such as motors, gears, rollers and the like, which are incorporated in a paper feed portion, an image forming portion, a fixing portion and the like. These components cause vibration which is a source of noise. Further, this vibration also vibrates other components, resulting in more noise within the image forming apparatus.

For example, a typical image forming apparatus may have a plurality of optical scanning units each having a polygon mirror motor which creates noise. Image writing positions of light beams coming from surfaces of polygon mirrors in the plurality of scanning units of the image forming apparatus have to be aligned to one another, and accordingly, the writing positions of light beams coming from surfaces of the polygon mirrors are detected. Further, in a certain image forming apparatus, polygon mirror motors for rotating the polygon mirrors are provided thereto with speed detecting elements, respectively, in order to rotate the polygon mirrors at an equal speed (Refer to Japanese Patent Laid-Open No. 09-230273).

Next, an explanation will be made herein below with regard to a conventional polygon mirror motor assembly 200 which is typically part of an image forming apparatus having a plurality of optical scanning units with reference to FIG. 2. The polygon mirror motor assembly 200 includes a rotating polygon mirror 101, a motor 102, a rotary shaft 103, a leaf spring 104 for pressing and fastening the rotating polygon mirror 101 to the rotary shaft 103, and a circuit board 105 of which the motor 102 is mounted thereon.

A predetermined radial gap (or tolerance) is disposed between the outer diameter of the rotary shaft 103 and the inner diameter of the rotating polygon mirror 101 in view of working efficiency during assembly on a mass production basis of the rotating polygon mirror 101 onto the motor 102 and the rotary shaft 103. Further, similarly, a predetermined radial gap is defined between the leaf spring 104 and the rotary shaft 103.

However, the aforementioned gaps are disadvantageous because they cause the polygon mirror motor assembly 200 to have an imbalance problem. That is, the rotary polygon mirror 101 fitted on the rotary shaft 103 is movable more or less in a radial direction due to these gaps, resulting in weight imbalance.

Conventionally, it has been known that the rotating polygon mirror 101 may be coated on its top surface with an imbalance correction putty (ultraviolet curable resin) as one of measures for improving the weight imbalance of the polygon mirror motor assembly 200. However, in view of the weight of the imbalance correction putty, the degree of accuracy of the coating, and the like, the aforementioned remedial attempt to achieve an adequate balance is still typically insufficient to improve the weight imbalance. Further, in order to ensure a nominal yield, it is necessary to tolerate or accept polygon mirrors 101 which have an inherent imbalance problem. That is to say, conventional polygon mirrors 101 are typically produced and shipped with an inherent imbalance problem more or less.

Therefore, a typical image forming apparatus having a plurality of optical scanning units, each including a polygon mirror having the above-mentioned configuration, has several problems associated with it. For instance, when the rotating polygon mirrors 101 are rotated, the plurality of optical scanning units vibrates, due to weight imbalances which are respectively inherent to the polygon mirrors 101 of the optical scanning units. It is noted here that since the polygon mirrors 101 are adapted to be subjected to PLL (Phase-Locked Loop) control, the polygon mirrors 101 are rotated with rotated phase relationships of the polygon mirrors 101 being fixed so as to cause the surface phases of the rotating polygon mirrors 101 to be equal to each other. Accordingly, the phase relationship in the direction of the weight imbalance causes arbitrary phase difference, and is changed each time when the image forming apparatus is energized.

Another problem pertains to the vibration from the optical scanning units, caused by weight imbalance of the polygon mirror motors 102 which is transmitted to a housing serving as a structure for supporting the rear surfaces of the optical scanning units, resulting in generation of noise. It is noted, as stated above, that the phase relationships of the polygon mirror motors 102 in their weight imbalance directions are arbitrary, and accordingly, the phase relationships are changed each time when the image forming apparatus is energized. As a result, the noise is also changed each time when the image forming apparatus is energized.

In an effort aimed at reducing noise, there has been proposed an image forming apparatus in which acoustic members are provided in a housing, and as well acoustic members disposed on an inner bottom surface and side surfaces of a paper feed tray in order to absorb sound generated in the paper feed tray during paper feed. Thereby it is possible to reduce noise (refer to, for example, Japanese Patent Laid-Open No. 2003-89467).

However, in the above-mentioned conventional example, acoustic members, sound suppressing members and the like are added in the apparatus, and as a result, the volume of the apparatus is increased, and the amount of work during assembly of the image forming apparatus is also increased so as to increase the costs of production.

In light of the aforementioned drawbacks of the conventional approaches of reducing unwanted noise, it would be beneficial to provide an image forming apparatus which is inexpensive and space-saving and which may exhibit noticeable noise reduction effects, with no provision of vibration preventing members, acoustic members, sound suppressing members and the like.

SUMMARY OF THE INVENTION

The present invention is devised in view of the problems as stated above, and accordingly, one aspect of the present invention to provide an image forming apparatus which is inexpensive and space-saving and which may exhibit stable noise reduction effects, with no provision of vibration preventing members, acoustic members, sound suppressing members and the like.

According to a first exemplary embodiment of the present invention, an image forming apparatus is provided which includes a plurality of optical scanners, each including a rotating polygon mirror adapted to scan and expose a surface of an image bearing medium to create an electrostatic latent image on the surface in accordance with image data; a plurality of phase detectors, each assigned to a respective one of the plurality of optical scanners for detecting rotated phases of the rotating polygon mirrors; and a rotated phase controller configured to control the rotated phases of the rotating polygon mirrors, wherein the rotated phase controller is configured to control the rotated phases of the rotating polygon mirrors in accordance with results of detection by the plurality of rotated phase detectors so that rotated phase relationships of the rotating polygon mirrors are set to a predetermined pattern.

According to an aspect of the aforementioned embodiment, as a result of the predetermined pattern, vibrations generated from the plurality of optical scanners are attenuated. According to another aspect of the present embodiment, the rotated phase controller controls the rotated phase relationships of the rotating polygon mirrors in accordance with the predetermined pattern in a unit of one surface, and in accordance with color misregistration data in a unit of not greater than one surface.

Moreover, according to yet another aspect of the present invention, the image forming apparatus may further include a plurality of detectors configured to detect directions of weight imbalance of the rotating polygon mirrors, wherein the rotating phase detectors detect the rotated phase relationships of the rotating polygon mirrors in accordance with results of detections by the plurality detectors. And furthermore, according to another aspect of the present invention, the image forming apparatus may further include a plurality of printing modes, wherein the rotated phase controller controls the rotated phases of the rotating polygon mirrors to have a phase relationship pattern in accordance with the printing modes.

Additionally, according to another exemplary embodiment of the present invention, an image forming apparatus is provided which includes a plurality of optical scanners, each including a rotating polygon mirror adapted to scan and expose a surface of an image bearing medium to create an electrostatic latent image on the surface; a rotated phase controller configured to control rotated phases of the rotating polygon mirrors; and a plurality of vibration detectors configured to detect vibration, wherein the rotated phase controller controls rotated phase relationships of the rotating polygon mirrors.

And according to another aspect of the aforementioned embodiment, the rotated phase controller controls rotated phase relationships of the rotating polygon mirrors in accordance with results of detection by the plurality of vibration detectors in a unit of one surface, and in accordance with color misregistration data in a unit of not greater than one surface. Moreover, according to another aspect of this embodiment, then image forming apparatus may further include a plurality of printing modes, wherein the rotated phase controller controls the rotated phases of the rotating polygon mirrors to have a phase relationship pattern in accordance with the printing modes.

Therefore, according to the embodiments of the present invention, by detecting a direction of weigh imbalance of the polygon mirror motor so as to control the phase to a specific phase with which the vibration of the polygon mirror motor is attenuated, and by providing the vibration detectors so as to fix the rotated phase of the polygon mirror motor with the timing with which the vibration of the housing is attenuated, in order to control the phase to a phase with which vibration of the housing is attenuated, stable noise reduction with low costs and with space saving may be made with no provision of vibration preventing members, acoustic members, sound suppressing members or the like.

Accordingly, there may be provided an image forming apparatus which is inexpensive and space saving, and which can exhibit an effect of noise reduction, with no addition of vibration preventing members, acoustic members and sound suppressing members.

Further embodiments and features of the present invention will become apparent from the following detailed description of the present invention with reference to the accompanying drawings.

BRIEF DESCRIPTION OF THE DRAWINGS

FIG. 4 schematically illustrates an exemplary phase relationship of an exposure unit according to an aspect of the present invention;

FIG. 5 is a table with exemplary results of measurement when the image forming apparatus is energized according to an aspect of the present invention;

FIG. 6 is a table with exemplary results of measurement when the image forming apparatus is energized according to an aspect of the present invention;

FIG. 10 is a schematic plan view illustrating an exemplary exposure unit according to an aspect of the present invention; and FIG. 11 is a block diagram illustrating phase control in the present embodiment according to an aspect of the present invention.

DESCRIPTION OF THE EMBODIMENTS

A detailed description is now herein provided for numerous embodiments, features and aspects of the present invention with reference the accompanying drawings.

First Exemplary Embodiment

Figure 1:
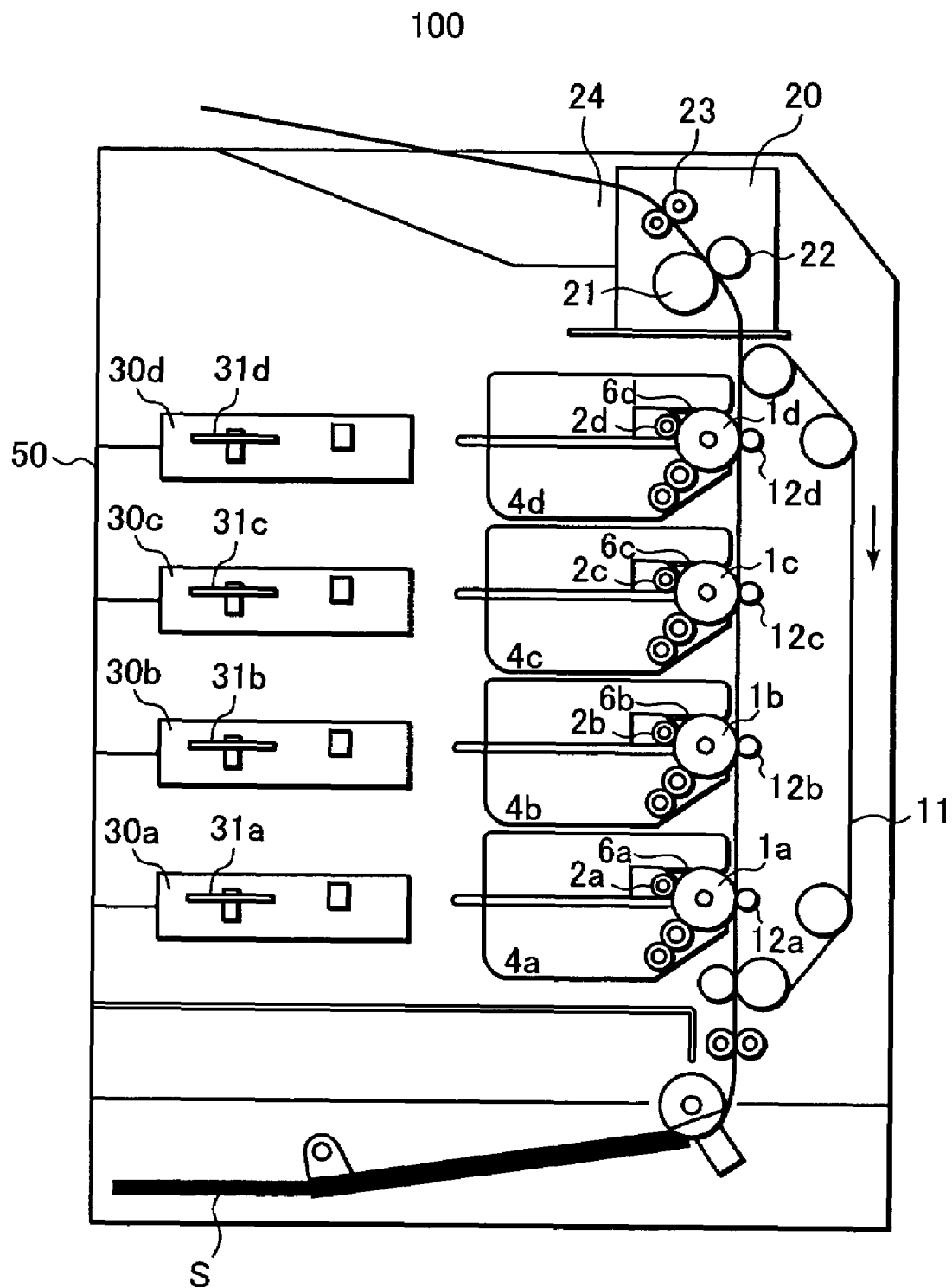
FIG. 1 is a sectional schematic view illustrating an exemplary configuration of an image forming apparatus in a first embodiment of the present invention.
Figure 2:
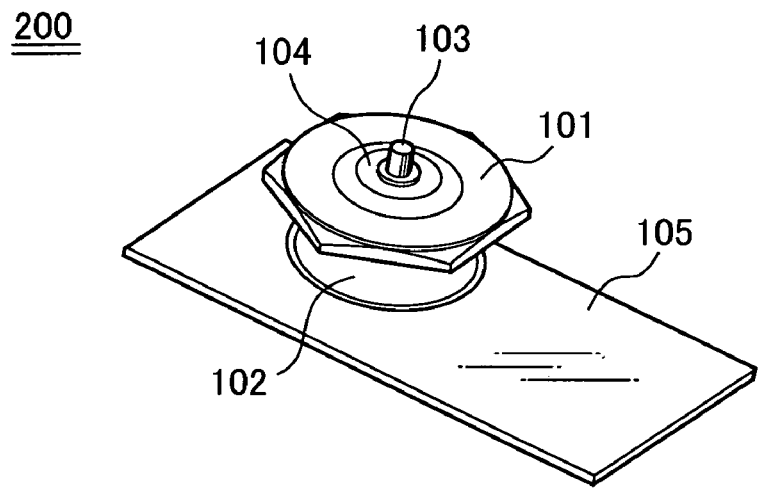
FIG. 2 is a perspective view illustrating a conventional configuration of a polygon mirror motor assembly.

FIG. 1 is a sectional schematic view illustrating an essential configuration of an image forming apparatus in an exemplary embodiment of the present invention. The image forming apparatus 100 incorporates four electro-photographic conductor drums (which will be herein below referred to as "photoreceptor drums") 1a, 1b, 1c, 1d for yellow, magenta, cyan and black, which serve as image bearing mediums and which are arranged linearly in a vertical direction in a parallel relation, and a conveyer belt 11 laid along the photoreceptor drums 1a to 1d, and serving as a transfer medium conveying unit for adsorbing thereto a recording sheet S as a transfer sheet which is adsorbed thereto through electrostatic adsorption.

Primary chargers 2a, 2b, 2c, 2d are arranged respectively around the photoreceptor drums 1a, 1b, 1c, 1d for uniformly charging the outer surfaces of the photoreceptor drums 1a to 1d, in the mentioned order from the upstream side in the rotating direction. Also, exposure units 30a, 30b, 30c, 30d are provided which serve as optical scanning units for projecting laser beams onto the outer surfaces of the photoreceptor drums 1a to 1d which are uniformly charged, in accordance with image data so as to create electrostatic latent images thereon.

The exposure units 30a to 30d incorporate respectively therein polygon mirror motor assemblies (herein after referred as "polygon mirror motors") 31a, 31b, 31c, 31d serving as scanning members for deflecting laser beams so as to scan and expose the outer surfaces of the photoreceptor drums 1a to 1d.

Further, there are arranged developing units 4a, 4b, 4c, 4d serving as developing units for applying color toners onto the outer surfaces of the photoreceptor drums on which latent images have been created so as to visualize the latent images into toner images, and cleaning members 6a, 6b, 6c, 6d as cleaning units for removing residual toner on the outer surfaces of the photoreceptor drums after transferring the toner images onto the transfer medium.

Further, transfer rollers 12a, 12b, 12c, 12d serving as transfer units for transferring the toner images formed on the outer surfaces of the photoreceptor drums 1a to 1d, onto the recording sheet S which is carried on and conveyed by the conveyer belt 11, are arranged at positions in opposite to the photoreceptor drums 1a to 1d across the conveyer belts 11.

A fixing unit 20 serving as a fixing unit is adapted to fix the toner image on the recording sheet S thereon to, based on a heat and a pressure provided by fixing rollers 21 and 22. A pair of paper discharge rollers 23 discharge the recording sheet S onto a paper discharge tray 24 where recording sheets S are stacked one upon another.

The exposure units 30a to 30d are supported to a housing 50. The housing 50 has left and right side panels which are not shown and with which the exposure units 30a to 30d are supported, and a stay bridges between the right and left panels so as to form a frame for enhancing the stiffness of the housing 50. The exposure units 30a to 30d having rotating members, are fastened to the left and right side panels, direct thereto or through the intermediary of exposure unit attaching stays which are not shown. The exposure units 30a to 30d are assembled, respectively having a mechanism for reducing, as possible as it can, vibration thereof. Further, the housing 50 is formed of materials such as sheet metal or resin.

Figure 3A:
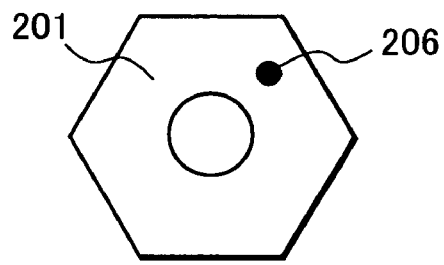
FIG. 3A is a schematic plan view illustrating an rotating polygon mirror according to an aspect of the present invention.

Explanation will now be made of an exemplary method of detecting a direction of weight imbalance and an exemplary method of controlling a rotated phase, according to the present invention, with reference to FIGS. 3A and 3B. FIG. 3A is a schematic plan view illustrating a rotating polygon mirror 201, and FIG. 3B is a schematic view illustrating a configuration of a detector for detecting a direction of weight imbalance and a polygon mirror motor.

Referring to FIG. 3A, a mark 206 has been previously formed on the upper surface of the rotating polygon mirror 201 at a position spaced from the center axis by a predetermined distance in a direction of weight imbalance which is caused when the polygon mirror motors 31a to 31d are rotated.

Figure 3B:
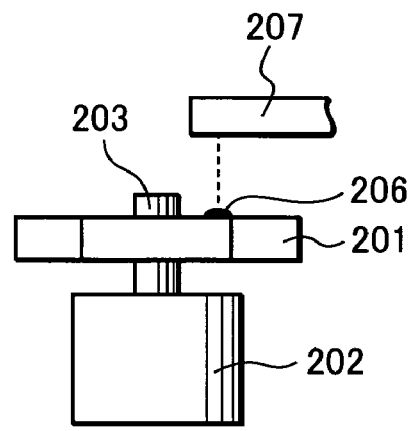
FIG. 3B is a schematic view illustrating an exemplary configuration of a reflecting type photo-interrupter and a polygon mirror motor according to an aspect of the present invention.

Next, referring to FIG. 3B, according to an aspect of the present invention, a reflection type photo-interrupter 207 serving as a detector for detecting a direction weight imbalance is provided at a predetermined position in each of the exposure units 30. Further, the rotating polygon mirror 201 is mounted to the rotary shaft 203 of a motor 202. With this configuration, the mark 206 passes underneath the reflection type photo-interrupter 207 when the rotating polygon mirror 201 is rotated. A quantity of reflected light received by the reflection type photo-interrupter 207 is changed when the mark 206 passes underneath the photo-interrupter 207, and accordingly, a variation in the quantity of reflected light is recognized as a detection signal.

With the provision of the above-mentioned configuration to each of the polygon mirror motors 31a to 31d, a direction of weight imbalance of each of the polygon mirror motors 31a to 31d can be detected. In this embodiment, the detection of a direction of weight imbalance is carried out each time when the image forming apparatus 100 is energized.

Next, detection signals from the reflection type photo-interrupters 207 in the polygon mirror motors 31a to 31d are compared with one another by a phase detection circuit 209 (see FIG. 8) serving as a rotated phase detection unit, and phase relationships (rotated phases) of the polygon mirrors in the directions of weight imbalance are detected from time differences of detection of the marks 206 by the reflection type photo-interrupters 207.

Figures 7, 8:
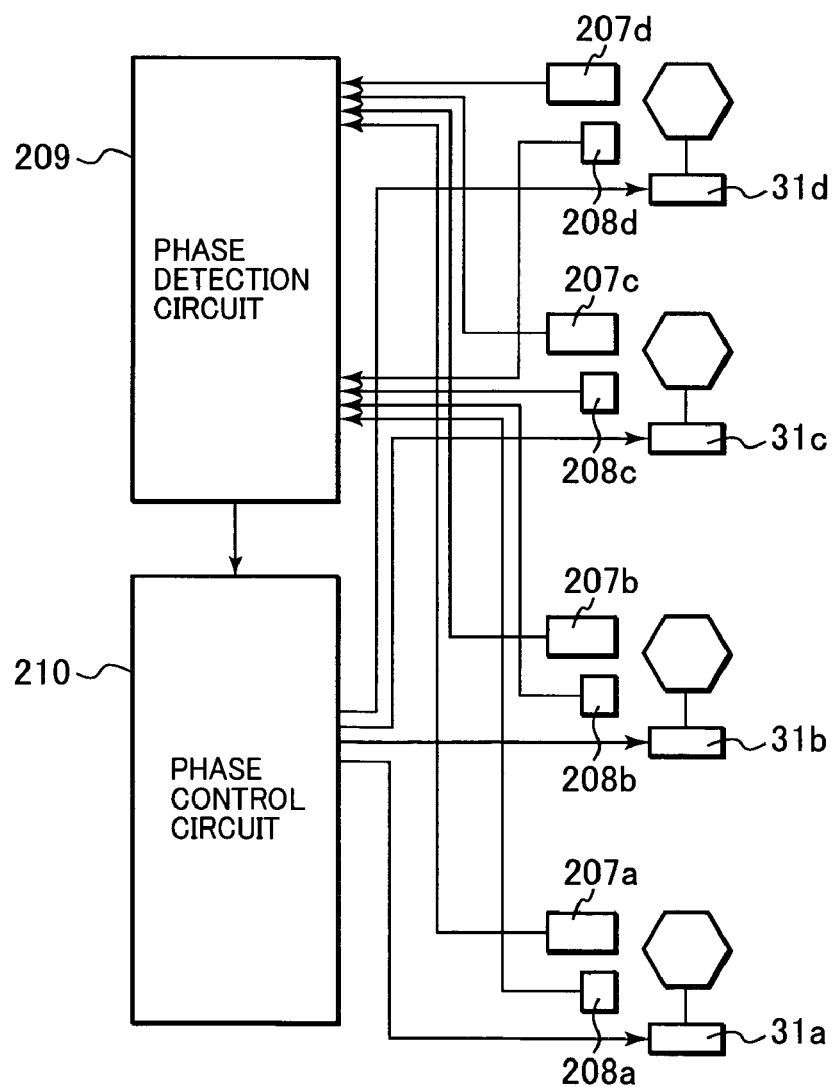
FIG. 7 is a view showing results of measurement when the image forming apparatus is energized according to an aspect of the present invention.
FIG. 8 is a block diagram illustrating exemplary phase control according to an aspect of the present invention.

Then, with reference to a detection signal from any one of the reflection type photo-interrupters 207 in the polygon mirror motors 31a to 31d, correction values for setting phase relationships of the remaining polygon mirror motors 31a to 31d in the directions of imbalance to a predetermined phase relationship previously stored in a memory unit, are calculated and then are delivered to a phase control circuit 210 (see FIG. 8).

The phase control circuit 210 carries out phase lock loop (PLL) control for the polygon mirror motors 31a to 31d in order to control the phase relationship (rotated phases) in the direction of weight imbalance.

With the result of controlling the phase relationship in the direction of weight imbalance, if the surface phases of the rotating polygon mirrors 201 do not become equal to each other so as affect the image forming apparatus, the PLL control may be carried out for fixing the relationships of rotated phases of the polygon mirror motors 31a to 31d after the rotated phase of the polygon mirrors 31a to 31d are controlled, so that the surface phases of the rotating polygon mirrors 201 are substantially equal to one another within a range around the phase relationship in the direction of imbalance after the control.

Further, if the surface phases of the rotating polygon mirrors 201 have to be shifted with a specific phase in order to correct a color misregistration or the like, the PLL control can be carried out being added with a shift value of the specific phase. That is, the phase of the rotating polygon mirror 201 is controlled in a unit of one surface in accordance with a result of detection of a direction of weight imbalance, and is also controlled in a unit of not greater than one surface in accordance with color misregistration data as a result of detection.

FIGS. 4A-B schematically show exemplary phase relationships of the exposure units 30a to 30d. The arrows in the figure indicate directions of imbalance of the polygon mirror motors 31a to 31d. The figure shows phase relationships in such a case that imbalance values of the polygon mirror motors 31a to 31d are set to 1.5 mg·cm which is worse.

In this embodiment, the index of the imbalance value of each of the polygon mirror motors is used as a common numeric value with a unit of mg·cm as a unit of balance. It is noted here that as to the unit of balance, that is, mg·cm, for example, 1.0 mg·cm exhibits an imbalance value in such a case that the a weight having 0.1 mg is set at a position by a distance of 1.0 cm from the center of the rotary shaft.

FIG. 4A shows phase relationships before controlling rotated phases in the direction of weight imbalance. The phase relationship in the direction of weight imbalance is in phase as to the exposure units 30a, 30c, and 30d, but is in opposite phase only as to the exposure unit 30b.

FIG. 4B shows phase relationships after controlling the rotated phases. The phase relationship in the direction of weight imbalance is in phase as to the exposure units 30a, 30b, 30d, but is in opposite phase as to the exposure unit 30c. If the phase relationships of the exposure units 30a, 30b, 30c, 30d are exhibited by a pattern shown in FIG. 4B, the vibration of the housing 50 is reduced.

FIGS. 5 and 6 are tables which include results of the measurements which are obtained when an image forming apparatus 100 according to the present invention is actually energized.

FIG. 5 includes degrees of vibration of the housing 50 with the phase relationships of the exposure units 30a to 30d which are shown in FIGS. 4A and 4B. The degree of vibration with the phase relationship shown in FIG. 4A was 17.6 mm, and on the contrary, the degree of vibration with the phase relationship shown in FIG. 4B was 0.36 mm. In view of the above-mentioned results, it is understood that the vibration of the housing 50 is reduced by a large degree after controlling the rotated phase. The number of measurement points of vibration is 63 in total within a lattice of 9 vertical points and 7 horizontal points.

FIG. 6 includes noise levels of the image forming apparatus 100 with the phase relationships of the exposure units 30a to 30d shown in FIGS. 4A and 4B. The noise level with the relationship shown in FIG. 4A was 5.51 Bels, and was 4.84 Bels with the phase relationship after controlling the rotated phase as shown in FIG. 4B.

In view of the above-mentioned results, it is understood that the noise level is reduced by a large degree after controlling the rotated phase. As stated above, by controlling the rotated phase of the exposure units 30a to 30d, the vibration of the exposure units 30a to 30d can be reduced, and accordingly, the vibration of the housing 50 can be reduced, thereby it is possible to reduce noise of the image forming apparatus 100. Further, as shown in FIG. 4B, by controlling the rotated phase into a specific phase relationship, it is possible to eliminate such a problem that noise is changed each time when the image forming apparatus is energized.

FIG. 7 shows noise levels of the image forming apparatus 100 in eight phase patterns in such a case that the phase difference is 180 deg. in the direction of weight imbalance in the exposure units 30a to 30d. Phase patterns a and b are similar to the phase patterns (a) and (b) shown in FIGS. 4 and 6. With these results, it is understood that the phase pattern b exhibits the lowest noise level. As stated above, an optimum phase relationship of the image forming apparatus 100 is previously analyzed in a direction of weight imbalance before mass production thereof at an industrial firm, and the optimum phase relationship is stored in memory in the phase control circuit, thereby it is possible to control the phase for obtaining the phase relationship having a predetermined phase pattern.

It is noted that although explanation has been made of such a case that the phase difference of 180 deg. in phase and in opposite phase is obtained as a result in this embodiment, the optimum phase relationship should not be limited to this angle.

FIG. 8 is a block diagram for explaining the phase control in this exemplary embodiment. Laser beam detectors 208a to 208d detect projection timings of laser beams, and surface phases of the polygon mirror motors 31a to 31d. Thus, detection signals from reflective type photo-interrupters 207a to 207d and detection signals from the laser beam detectors 208a to 208d are delivered to the phase control circuit 210 by way of the phase detection circuit 209 so as to carry out the PLL control for controlling the phase relationships of the polygon mirror motors 31a to 31d.

It is noted that even in the case of the image forming apparatus 100 which has a plurality of printing modes, or in the case of the polygon mirror motors 31a to 31d which have a plurality of speeds, by controlling the rotated phases into such a specific phase relationship that the vibration of the housing 50 is reduced depending upon a printing mode or a motor speed, the noise of the image forming apparatus 100 can be reduced.

Second Exemplary Embodiment

Figure 9:
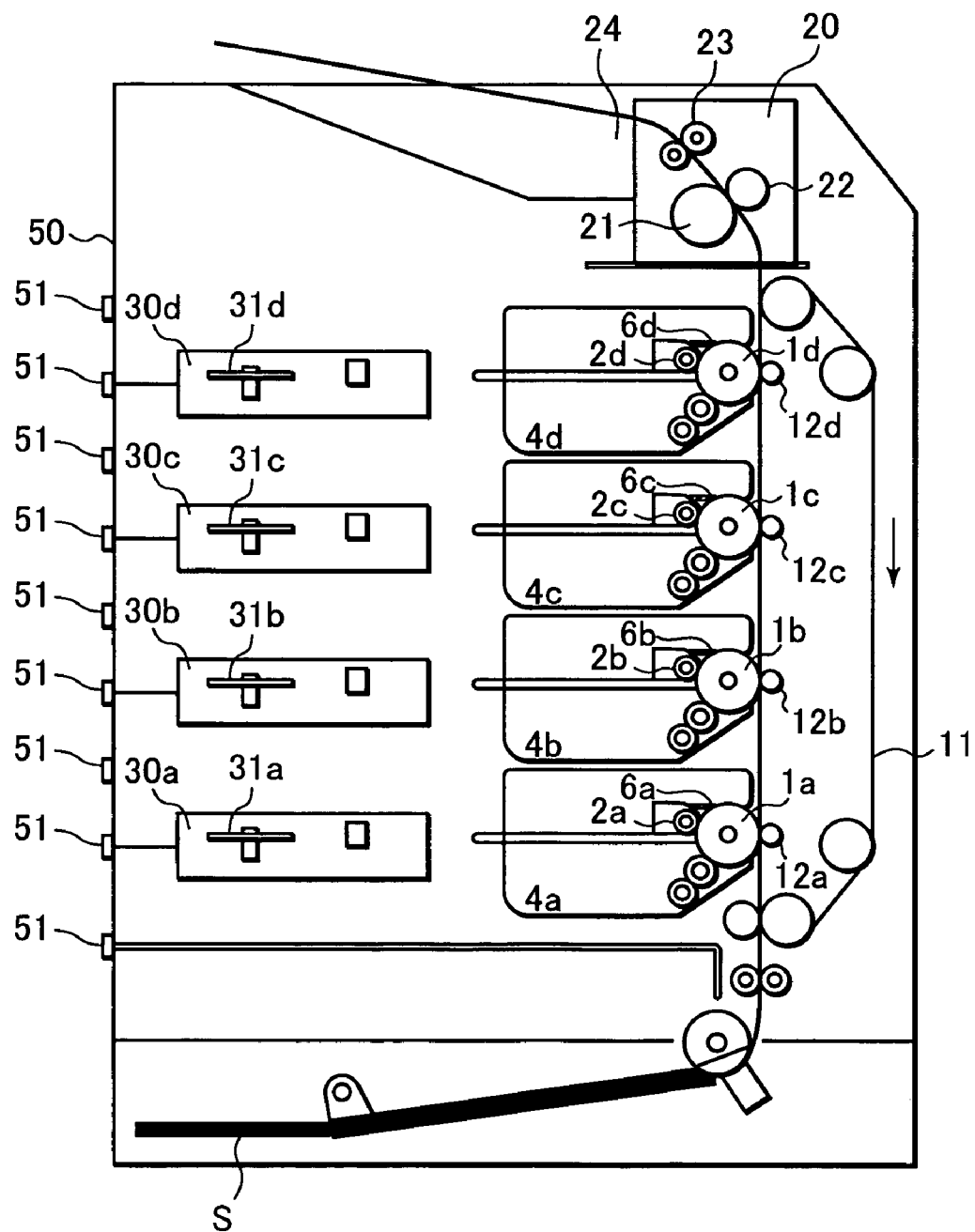
FIG. 9 is a sectional schematic view illustrating an exemplary configuration of an image forming apparatus in another embodiment.

FIG. 9 is a sectional schematic view illustrating an exemplary configuration of the image forming apparatus in this embodiment. An image forming apparatus 101 has a similar configuration as that of the first embodiment shown in FIG. 1, except that a vibration detector system 51 serving as a vibration detecting unit is provided in the housing 50. It is noted that the detecting unit for a direction of weight imbalance and the phase control unit in the direction of weight imbalance are not provided in this embodiment.

Explanation will now be made of the relationship between the exposure units 30a to 30d and the housing 50 with reference to FIG. 10 which is a schematic plan view which shows the exposure units 30a to 30d which are supported at their left and right sides by a left side panel 52 and a right side panel 53 and at their rear sides by the housing 50.

Further, the polygon motor motors 31a to 31d are located at positions as shown in FIG. 10. Thus, vibration of the exposure units 30a to 30d caused by weight imbalance of the polygon mirror motors 31a to 31d are transmitted, perpendicular to the housing 50 in comparison with the left side panel 52 and the right side panel 53. Accordingly, it is more effective to arrange the vibration detector 51 (from FIG. 9) to the housing 50, rather than to the left side panel 52 or the right side panel 53 although it is, of course, possible to provide the vibration detector 51 to the left side panel 52 or the right side panel 53.

Accordingly, as shown in FIG. 9, a plurality of the vibration detectors 51 are provided to the housing 50. More specifically, points on the housing 50 which are extremely vibrated by the vibrations of the exposure units 30 have been previously analyzed. Thus, a plurality of the vibration detectors (such as acceleration pick-ups) 51 are provided to the housing 50 at the points.

For example, there are set nine points in the vertical direction, that is, four points directly below the support parts of the exposure units 30a to 30d, three points between the exposure units 30 and apertures in which the exposure units 30 are accommodated, one point downward from the support part of the exposure unit 30a by a distance of 20 mm, and one point downward from the support part of the exposure unit 30d by a distance of 40 mm. Further, similarly, there are vertically set nine points in each of left and right sides at intermediate positions from the support parts of the exposure units 30 to the left and right fastening positions. Thus, there are set twenty seven points in total in this example. However, it is noted that the aforementioned arrangement is merely exemplary, and that there are various other arrangements in which the vibration detectors may 51 may be arranged with respect to points on the housing.

The vibration detectors 51 detect vibration of the housing 50 each time when the image forming apparatus 101 is energized. Then, at the timing with which the vibration of the housing 50 is reduced, based upon the result of detection by the vibration detectors 51, the polygon mirror motors 31a to 31d are subjected to the PLL control so as to fix the rotated phases of the polygon mirror motors 31a to 31d, that is, the phase relationships of the polygon mirror motors 31a to 31d in the direction of weight imbalance are fixed. That is, the polygon mirror motors 31a to 31d are rotated in such a condition that the phase relationships of the polygon motors 31a to 31d in the directions of weight imbalance are fixed.

In the result of control of the phase relationships in the directions of weight imbalance, if the surface phases of the rotating polygon mirrors do not substantially coincide with one another so as to cause any influence upon the image forming apparatus, the PLL control for fixing the relationships as to the rotated phases of the polygon mirror motors 31a to 31d can be carried out, after the control of the rotated phases of the polygon mirror motors 31a to 31d, so as to cause the surface phases of the rotating polygon mirrors 201.to be coincide with one another within a predetermined range around the phase relationship in the directions of weigh imbalance after the control. Further, if the surface phases of the rotating polygon mirrors 201 are shifted to specific phases for color misregistration correction or the like, the PLL control can be carried out including shift values of the specific phases.

That is, the phases of the rotating polygon mirrors 201 are controlled in a unit of one surface in accordance with a result of detection in the direction of weight imbalance, and also, the control is made in unit of not greater than one surface in accordance with color misregistration data which is a result of detection of color misregistration.

FIG. 11 is a block diagram for explaining the phase control in this embodiment. The laser beam detectors 208a to 208d detect projection timings of laser beams, and surface phases of the polygon mirror motors 31a to 31d. Thus, the detection signals from the laser beam detectors 208a to 208d are delivered to a phase control circuit 212 by way of the phase detection circuit 211. As stated above, at the timing with which the vibration is reduced, based upon the result of detection by the vibration detectors 51, signals from the vibration detectors 51 are delivered to the phase control circuit 212 so as to carry out the PLL control, and accordingly, the phase relationships of the polygon mirror motors 31a to 31d are controlled.

As stated above, with the timing at which the vibration of the housing 50 is attenuated, the phase relationships of the polygon mirror motors 31a to 31d in the directions of weight imbalance are fixed, and the polygon mirror motors 31a to 31d are rotated so as to attenuate the vibration of the housing 50. Thereby, it is possible to reduce noise of the image forming apparatus 101. Further, it is possible to eliminate such a problem that noise varies each time when the image forming apparatus 101 is energized.

Other Exemplary Embodiments

Although explanation has been made of various embodiments, the present should not be limited to these embodiments, but further modifications and application of the invention may be made within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-155475, filed May 27, 2005, which is hereby incorporated by reference herein in its entirety.

What is claimed:

1. An image forming apparatus comprising:
   a plurality of optical scanners, each including a rotating polygon mirror, the mirror having weight imbalance and weight imbalance direction that scans and exposes a surface of an image bearing medium to create an electrostatic latent image on the surface in accordance with image data;
   a plurality of phase detectors, each assigned to a respective optical scanner to detect rotated phases of the rotating polygon mirrors; and
   a rotated phase controller that controls the rotated phases of the rotating polygon mirrors,
   wherein the rotated phase controller controls the rotated phases of the rotating polygon mirrors in accordance with results of detection by the plurality of rotated phase detectors so that a relationship of the weight imbalance direction of each of the polygon mirrors is set in a predetermined pattern to reduce vibration of the optical scanners which is caused by weight imbalance of the polygon mirrors,
   wherein the rotated phase controller controls the rotated phases of the rotating polygon mirrors in accordance with the result of detection in a unit of one surface of the rotating polygon mirror so that the relationship of the weight imbalance direction of each of the polygon mirrors is set in the predetermined pattern and
   wherein, after controlling the rotated phases of the rotating polygon mirrors in the unit of one surface, the rotated phase controller controls the rotated phases of the rotating polygon mirrors in accordance with color misregistration data in a unit of not greater than one surface of the rotating polygon mirror.

2. An image forming apparatus according to claim 1, wherein the weight imbalance of the polygon mirrors depend on assembly error.

3. An image forming apparatus as set forth in claim 1, further comprising a plurality of printing modes, wherein the rotated phase controller controls the rotated phases of the rotating polygon mirrors so that the rotated phase relationships of the rotating polygon mirrors is set to reduce vibration of the optical scanners which is caused by weight imbalance of the polygon mirrors every printing mode.

4. An image forming apparatus comprising:
   a plurality of optical scanners, each including a rotating polygon mirror that scans and exposes a surface of an image bearing medium to create an electrostatic latent image on the surface;
   a rotated phase controller that controls rotated phases of the rotating polygon mirrors; and
   a plurality of vibration detectors that detect vibration,
   wherein the rotated phase controller controls rotated phases relationship of the rotating polygon mirrors in accordance with results of detection by the plurality of vibration detectors to reduce vibration of the optical scanners,
   wherein the rotated phase controller controls the rotated phases relationship of the rotating polygon mirrors in accordance with results of detection by the plurality of vibration detectors in a unit of one surface of the rotating polygon mirror, and wherein, after controlling the rotated phases of the rotating polygon mirrors in the unit of one surface, the rotated phase controller controls the rotated phases relationship of the rotating polygon mirrors in accordance with color misregistration data in a unit of not greater than one surface of the rotating polygon mirror.

5. An image forming apparatus as set forth in claim 4, further comprising a plurality of printing modes, wherein the rotated phase controller controls the rotated phases of the rotating polygon mirrors so that the rotated phase relationships of the rotating polygon mirrors are set to reduce vibration of the optical scanners which is caused by weight imbalance of the polygon mirrors every printing mode.

6. A method of controlling an image forming apparatus that includes a plurality of optical scanners, each including a rotating polygon mirror, the mirror having weight imbalance and weight imbalance direction that scans and exposes a surface of an image bearing medium to create an electrostatic latent image on the surface in accordance with image data; a plurality of phase detectors, each assigned to a respective optical scanners to detect rotated phases of the rotating polygon mirrors; and a rotated phase controller that controls the rotated phases of the rotating polygon mirrors, the method comprising:

controlling the rotated phases of the rotating polygon mirrors in accordance with results of detection by the plurality of rotated phase detectors so that a relationship of the weight imbalance direction of each of the polygon mirrors is set in a predetermined pattern to reduce vibration of the optical scanners which is caused by weight imbalance of the polygon mirrors, including, controlling the rotated phases of the rotating polygon mirrors in accordance with the result of detection in a unit of one surface of the rotating polygon mirror so that the relationship of the weight imbalance direction of each of the polygon mirrors is set in the predetermined pattern, and controlling the rotated phases of the rotating polygon mirrors in accordance with color misregistration data in a unit of not greater than one surface of the rotating polygon mirror after controlling the rotated phases of the rotating polygon mirrors in the unit of one surface.

7. The method according to claim 6, wherein the weight imbalance of the polygon mirrors depend on assembly error.

8. The method according to claim 6, wherein the rotated phase controller controls the rotated phases of the rotating polygon mirrors so that the rotated phase relationship of the rotating polygon mirrors is set to reduce vibration of the optical scanners which is caused by weight imbalance of the polygon mirrors every printing mode.

9. A method for controlling an image forming apparatus that includes a plurality of optical scanners, each including a rotating polygon mirror that scans and exposes a surface of an image bearing medium to create an electrostatic latent image on the surface; a rotated phase controller that controls rotated phases of the rotating polygon mirrors; and a plurality of vibration detectors that detect vibration, the method comprising:

controlling the rotated phases relationship of the rotating polygon mirrors in accordance with results of detection by the plurality of vibration detectors to reduce vibration of the optical scanners, including, controlling the rotated phases relationship of the rotating polygon mirrors in accordance with results of detection by the plurality of vibration detectors in a unit of one surface of the rotating polygon mirror, and controlling the rotated phases relationship of the rotating polygon mirrors in accordance with color misregistration data in a unit of not greater than one surface of the rotating polygon mirror after controlling the rotated phases of the rotating polygon mirrors in the unit of one surface.

10. The method according to claim 9, further comprising controlling the rotated phases of the rotating polygon mirrors so that the rotated phase relationships of the rotating polygon mirrors are set to reduce vibration of the optical scanners which is caused by weight imbalance of the polygon mirrors every printing mode.

* * * * *